US011122738B2

(12) United States Patent
Kelly et al.

(10) Patent No.: US 11,122,738 B2
(45) Date of Patent: Sep. 21, 2021

(54) CUTTER HOUSING ASSEMBLY FOR A LAWNMOWER, LAWNMOWER HAVING SAME, AND CONVERTIBLE LAWNMOWER

(71) Applicant: Honda Motor Co., Ltd., Tokyo (JP)

(72) Inventors: Teegan L. Kelly, Burlington, NC (US); Robert A. Recher, Mebane, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 16/392,191

(22) Filed: Apr. 23, 2019

(65) Prior Publication Data

US 2020/0337231 A1     Oct. 29, 2020

(51) Int. Cl.
| | |
|---|---|
| *A01D 34/81* | (2006.01) |
| *A01D 34/00* | (2006.01) |
| *A01D 42/00* | (2006.01) |
| *A01D 34/66* | (2006.01) |
| *A01D 34/71* | (2006.01) |

(52) U.S. Cl.
CPC ........... *A01D 34/81* (2013.01); *A01D 34/005* (2013.01); *A01D 34/667* (2013.01); *A01D 34/71* (2013.01); *A01D 42/005* (2013.01)

(58) Field of Classification Search
CPC .... A01D 34/81; A01D 34/005; A01D 34/667; A01D 34/71; A01D 34/668; A01D 42/005; A01D 341/81
See application file for complete search history.

(56) References Cited

U.S. PATENT DOCUMENTS

| | | | | |
|---|---|---|---|---|
| 5,212,938 A | * | 5/1993 | Zenner | A01D 34/005 |
| | | | | 56/17.5 |
| 5,457,947 A | | 10/1995 | Samejima et al. | |
| 5,481,858 A | * | 1/1996 | Chudy | A01D 34/005 |
| | | | | 56/17.5 |
| 5,499,495 A | * | 3/1996 | Heisman | A01D 34/82 |
| | | | | 56/17.5 |
| 5,771,672 A | * | 6/1998 | Gummerson | A01D 34/64 |
| | | | | 56/15.4 |
| 5,826,416 A | * | 10/1998 | Sugden | A01D 34/71 |
| | | | | 56/320.2 |
| 6,073,305 A | * | 6/2000 | Hesskamp | A47L 5/14 |
| | | | | 15/405 |

(Continued)

*Primary Examiner* — Thomas B Will
*Assistant Examiner* — Madeline Ivy Runco
(74) *Attorney, Agent, or Firm* — Kenealy Vaidya LLP

(57) ABSTRACT

A cutter housing for a lawnmower can include first and second cutting chambers with first and second chamber walls and first/second discharge openings. First and second ring gates that have openings and blocking segments can be concentrically placed within respective first and second chamber walls, and rotatably attached to the cutter housing. The first and second ring gates can be rotated between: (a) an opened position in which the first/second ring gate is positioned with the first/second ring opening having a first overlap with a first/second discharge opening to provide a discharge mode, and (b) a closed position in which the first/second ring gate is positioned with the first/second ring opening having a decreased overlap, relative to the first overlap, with the first/second discharge opening to provide a mulch mode. The ring gates can be stopped at intermediate positions to provide a partial mulch mode or partial discharge mode.

20 Claims, 10 Drawing Sheets

(56) References Cited

U.S. PATENT DOCUMENTS

| | | | |
|---|---|---|---|
| 6,484,481 B1* | 11/2002 | Langworthy | A01D 69/02 56/6 |
| 6,609,358 B1 | 8/2003 | Schmidt et al. | |
| 6,681,553 B2* | 1/2004 | Ferree | A01D 34/667 56/13.6 |
| 6,874,309 B1* | 4/2005 | Bellis, Jr. | A01D 42/005 56/320.2 |
| 6,874,310 B2 | 4/2005 | Osborne | |
| 6,990,793 B2* | 1/2006 | Osborne | A01D 42/005 56/320.1 |
| 7,069,712 B2* | 7/2006 | Bauer | A01D 34/71 56/12.8 |
| 7,174,700 B2 | 2/2007 | Chenevert et al. | |
| 7,204,073 B1 | 4/2007 | Chenevert | |
| 7,555,887 B2 | 7/2009 | Schick et al. | |
| 7,571,593 B2* | 8/2009 | Kucera | A01D 43/063 56/202 |
| 7,665,286 B2* | 2/2010 | Butler | A01D 34/005 56/320.1 |
| 7,677,022 B2 | 3/2010 | Chenevert et al. | |
| 7,823,373 B1 | 11/2010 | Loxterkamp et al. | |
| 8,959,882 B2* | 2/2015 | Gonzalez | A01D 34/667 56/320.1 |
| 9,485,911 B2 | 11/2016 | Thorman et al. | |
| 9,510,516 B2* | 12/2016 | Shumaker | A01G 20/43 |
| 9,750,179 B2 | 9/2017 | Korthals et al. | |
| 10,045,481 B2* | 8/2018 | Chase | A01D 34/71 |
| 2007/0101693 A1* | 5/2007 | Korthals | A01D 34/66 56/320.1 |
| 2009/0266043 A1 | 10/2009 | Schick et al. | |
| 2017/0339826 A1 | 11/2017 | Harvey | |
| 2018/0325024 A1* | 11/2018 | Rotole | A01D 34/006 |

* cited by examiner

CUTTER HOUSING ASSEMBLY FOR A LAWNMOWER, LAWNMOWER HAVING SAME, AND CONVERTIBLE LAWNMOWER

BACKGROUND

Lawnmowers can be configured as garden tractors, riding mowers, and walk-behind mowers. Some walk-behind mowers can include a prime mover mounted to the deck of the lawnmower. Mower decks associated with garden tractors, riding mowers and walk-behind mowers can be removably attached to the frame of these self-propelled machines. More than one blade can be mounted in the cutting chamber of the deck for any of these embodiments of a lawnmower.

Lawnmowers can be configured to either mulch clippings, which are generated as mowing is performed, or to discharge the clippings through a discharge chute or a discharge opening. Mulching mowers cut the clippings into fine particles and blow the clippings back into the lawn. Discharge mowers can either discharge the clippings directly onto the lawn surface or into a bag that is attached to the lawnmower. The clippings can then be disposed of elsewhere. Some lawnmowers can be converted between mulching lawnmowers and discharge lawnmowers by inserting or removing a removable conversion assembly within the cutter housing and/or the discharge chute such that the operator of the lawnmower removes or installs the removable assembly in order to place the lawnmower in the discharge mode and the mulching mode, respectively. Instead of a removable conversion assembly, some lawnmowers have a movable mulching assembly that remains mounted within the cutter housing and/or the discharge chute and is movable by the operator of the lawnmower between a mulching position and a discharging position within the cutter housing. Some mulching systems are variable mulching systems in which one or more movable components can be moved into any one of a plurality of positions between the mulching position and the discharging position such that some of the clippings are mulched and some of the clippings are directly discharged without mulching, via the discharge chute, into a collection bag or onto the ground.

SUMMARY

According to an aspect of the disclosed subject matter, a cutter housing assembly for a lawnmower can include a cutter housing that has a first cutting chamber with a first circular chamber wall that includes a first discharge opening, and a second cutting chamber with a second circular chamber wall that includes a second discharge opening. A first ring gate with a first ring opening and a first blocking segment can be concentric with the first circular chamber wall and rotatably attached to the cutter housing so as to be rotatable between: (a) an opened position in which the first ring gate is positioned with the first ring opening having a first overlap with the first discharge opening to provide a discharge mode, and (b) a closed position in which the first ring gate is positioned with the first ring opening having a decreased overlap, relative to the first overlap, with the first discharge opening to provide a mulch mode. A second ring gate, with a second ring opening and a second blocking segment, can be concentric with the second circular chamber and rotatably attached to the cutter housing so as to be rotatable between: (a) an opened position in which the second ring gate is positioned with the second ring opening having a first overlap with the second discharge opening to provide a discharge mode, and (b) a closed position in which the second ring gate is positioned with the second ring opening having a decreased overlap, relative to the first overlap, with the second discharge opening to provide a mulch mode. At least one actuator can be operatively engaged with at least one of the first ring gate and second ring gate, and controllable by a user to rotate at least one of the first ring gate and second ring gate between the opened position and the closed position, respectively, wherein the first ring gate rotates within the first cutting chamber and is concentric with the first cutting chamber.

According to another aspect of the disclosed subject matter, a cutter housing assembly for a lawnmower can include a first cutting side wall and top wall that define a first cutting chamber with a first discharge opening located within a side of the first cutting wall, the top wall including at least one slot. A ring gate, with a first ring opening and first blocking segment, can include at least one flange extending into the at least one slot of the top wall so as to be selectively rotatable in the slot between: (a) an opened position in which the ring gate is positioned with the first ring opening having a first overlap with the first discharge opening to provide a discharge mode, and (b) a closed position in which the ring gate is positioned with the first ring opening having a decreased overlap, relative to the first overlap, with the first discharge opening to provide a mulch mode. A first rotation actuator can include a motor operatively engaged with the at least one flange of the ring gate, and the first rotation actuator controllable by a user for rotating the ring gate between the opened position and the closed position, wherein the ring gate is configured to rotate within the first cutting chamber and is concentric with the first cutting chamber. A second cutting chamber with a second chamber side wall can include a second discharge opening, wherein the ring gate further includes a secondary ring opening and a secondary blocking segment configured such that, in the opened position the secondary ring opening has a secondary overlap with the second discharge opening, and (b) in the closed position the secondary ring opening has a decreased overlap, relative to the secondary overlap, with the second discharge opening.

According to another aspect of the disclosed subject matter, a lawnmower can include a cutter housing assembly that includes a first cylindrically shaped cutting chamber having a discharge opening, and a second cylindrically shaped cutting chamber located immediately adjacent to and in fluid communication with the first cylindrically shaped cutting chamber via a second opening. A first cylindrically shaped ring gate can be located within and concentric with the first cylindrically shaped cutting chamber, the first cylindrically shaped ring gate including a side wall and at least one opening in the side wall. A second cylindrically shaped ring gate can be located within and concentric with the second cylindrically shaped cutting chamber, the second cylindrically shaped ring gate including a second side wall and at least one opening in the second side wall. An actuator operatively can be connected to the first cylindrically shaped ring gate and the second cylindrically shaped ring gate and configured to rotate each of the first cylindrically shaped ring gate and the second cylindrically shaped ring gate.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
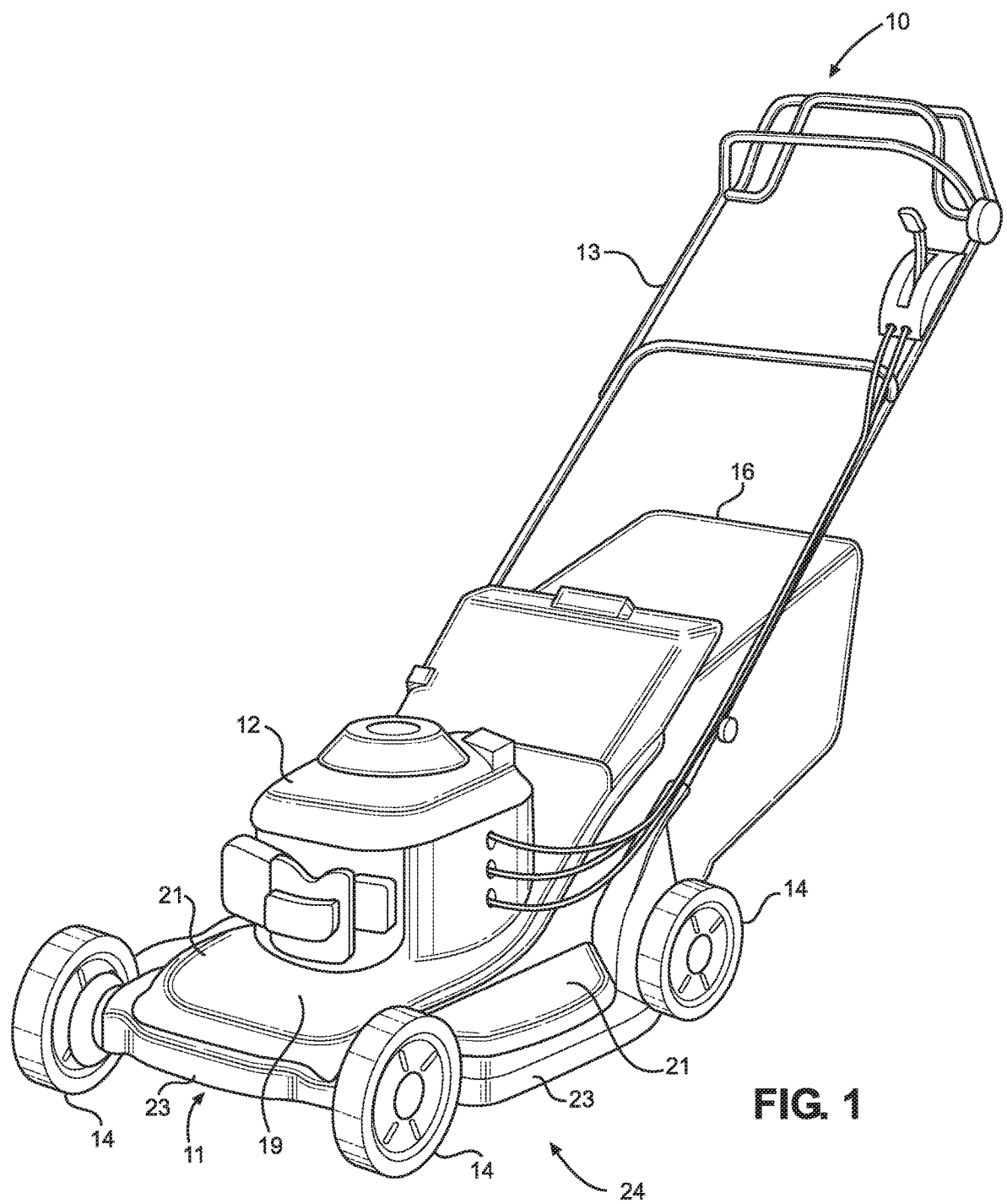
FIG. 1 is a perspective view of a conventional lawnmower.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Mulching assemblies are known that convert a lawnmower between a discharge mode and a mulch mode. Some mulching assemblies remain mounted in the cutter housing of the lawnmower and require many components, including different doors, levers, and rotating gears that facilitate conversion from a full mulching mode to a discharge mode. However, these many components can result in a labor-intensive assembly for manufacturing and/or for operation and maintenance. Thus, the manufacturing and operating cost for lawnmowers with automatic cutting/mulching conversion devices can be greater as compared to a lawnmower that includes a removable mulching conversion assembly. However, removal and installation processes for removable mulching conversion assemblies are typically inconvenient and time consuming. Thus, there is a need for an automatic mulching conversion assembly that can reduce manufacturing and operation cost and lessen or avoid any inconvenience perceived by the operator when converting the lawnmower between the discharge mode and the mulching mode.

In accordance with aspects of the disclosure, a variable mulch system for a single or multi bladed lawnmower deck or cutter housing can include rings or ring gates that surround cutting chambers. The rings can include holes or opening to allow for grass and other clippings to move from chamber to chamber and/or to be discharged. As the ring gates rotate, around the same axis as each of their respective blades, one or more openings/holes in each ring and/or openings/holes in the particular chamber are closed off. As the openings/holes are closed off, partial mulching and partial discharge can take place. Once the ring, for a particular chamber, is rotated such that the opening/hole is completely blocked, full mulching can take place. The rings, i.e. adjustable ring gates, can be suspended from a top of the cutter housing and ride in channels in the top of the cutter housing. The rings can be rotated by a push/pull cable system, a crank and gear system, or an electronically powered gear system, for example.

In accordance with at least one embodiment, a blade system of a lawnmower can include three cutting chambers for cutting grass. The chambers can be interconnected via openings/holes so the cut grass or other clippings can pass through from one chamber to another. Accordingly, a grass flow path can be provided. Once grass is transferred to the last chamber, the grass can be discharged onto the lawn via an opening/hole in the last chamber and in the last ring. The openings/holes can be adjustably opened and closed by an internal adjustable ring gate, attached to each chamber.

Accordingly, the disclosure provides a mower with a plurality of circular housing walls that can have openings forming a grass flow path, and gates defining walls that are concentric with the housing walls, such that the gates overlap the walls and rotate between positions to open and close the openings, in accordance with the disclosed subject matter.

Figure 2:
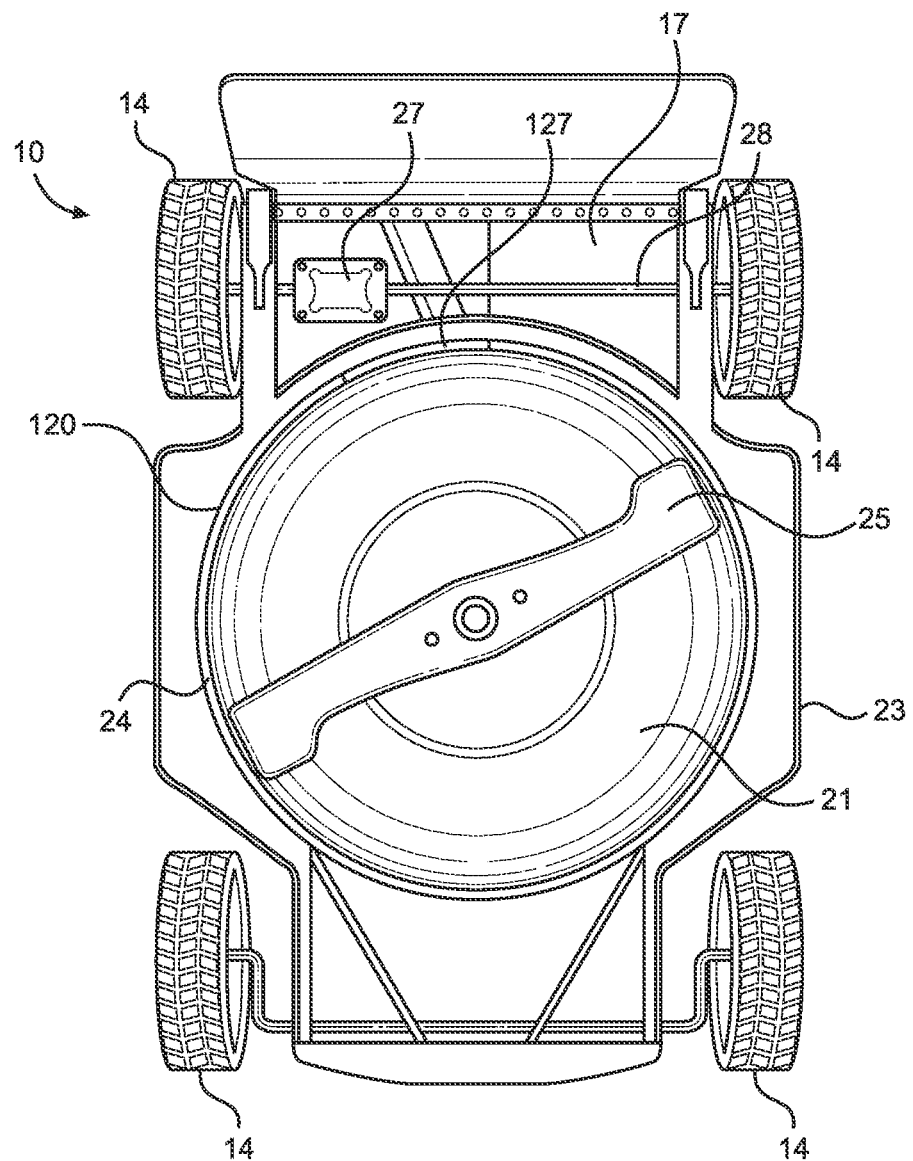
FIG. 2 is a bottom view of the lawnmower of FIG. 1.

FIG. 1 is a perspective view of a lawnmower 10, and specifically a walk-behind lawnmower, in accordance with an embodiment of the disclosure. FIG. 2 is a bottom view of the lawnmower of FIG. 1. The lawnmower 10 can include a cutter housing assembly that includes a cutter housing 11, and a shutter gate assembly as described below with respect to exemplary embodiments illustrated in FIGS. 5-9, and at least one blade 25 rotatably supported by the cutter housing 11. The cutter housing 11 can also be referred to as a deck or as a mower deck or as a cutter deck of the lawnmower 10. A prime mover 12 can be attached to the cutter housing 11. The prime mover 12 can be in the form of or include an internal combustion engine or an electric motor, for example. The prime mover 12 can be attached to a mounting portion 19 of the cutter housing 11 using an engine mount, bosses, mechanical fasteners, and/or other mechanical devices. The mounting portion 19 of the exemplary embodiment of FIG. 1 can surround an opening at a central portion of the cutter housing 11, and can include a plurality of mounting holes spaced around the opening. Referring to FIG. 2, the prime mover 12 can drive a driveshaft that supports at least one blade 25. The blade 25 can rotate in a cutting chamber 24 defined by the cutter housing 11 and opened toward the ground. In operation of the lawnmower, the prime mover 12 rotates the driveshaft, which, in turn, rotates the blade 25. As a result, the lawnmower 10 can perform a mowing operation on vegetation, such as to mow a lawn.

As shown in FIG. 1, the lawnmower 10 can include a steering handle 13 and a plurality of wheels 14. The steering handle 13 can include or be associated with various control mechanisms. Such control mechanisms can include speed controls for self-propelled lawnmowers, safety stop levers or bars, which the user depresses or holds to maintain the lawnmower in a running state, etc. In a self-propelled lawnmower, the wheels 14 at the rear of the lawnmower 10 can be driven so as to propel the lawnmower 10.

The lawnmower 10 can also include a discharge chute 17 and a collection bag 16. The discharge chute can be located at the rear of the cutter housing 11 and adjacent to the wheel 14 at the right rear of the cutter housing 11, for example. The discharge chute 17 can be oriented to discharge the vegetation clippings toward the side of the lawnmower 10 or toward the rear of the lawnmower 10. In the exemplary embodiment of FIG. 1, the discharge chute can discharge the clippings toward the rear of the lawnmower 10. When the lawnmower 10 is in a discharging mode, lawn clippings, for example, can be propelled from the cutting chamber 24, in which blade(s) 25 spins and in which vegetation is cut by the spinning blade(s), of the lawnmower 10 into the discharge opening and through a discharge chute 17. The clippings can pass through the discharge chute 17 and into the collection bag 16. Once the collection bag 16 is filled with lawn clippings, or at any other time, the collection bag 16 can be emptied. Alternatively, the collection bag 16 can be removed from the lawnmower 10, and the lawnmower 10 can discharge the clippings through the discharge chute and onto the ground. The lawnmower 10 can include a blade 25. Additionally, the lawnmower 10 can include gearbox 27 that drives rear axle 28. The gearbox 27 can be mechanically and operatively connected to the prime mover 12 so as to provide power to the rear axle 28.

As shown in FIG. 1 and FIG. 2, the cutter housing 11 can include a top wall 21 and one or more sidewalls 23 that extend downward from the top wall 21 and toward the ground. The top wall 21 can be demarcated from the sidewalls 23 by the top wall 21 having a substantially horizontal disposition and the sidewall(s) 23 having a substantially vertical disposition. The top wall 21 can be demarcated from the sidewall(s) 23 by being constructed of respective parts and/or being separated by a particular feature of the lawnmower, such as a distinct bend or ridge. The top wall 21 can be integrally formed with the sidewall(s) 23. For example, the top wall 21 and the sidewall(s) 23 can be integrally formed of stamped or cast metal or of molded plastic construction. In the exemplary embodiment of FIG. 1, the cutter housing 11 can be stamped from a steel sheet. A ring gate 120 can be provided within the cutter housing 11 and can include openings 127 that mate with discharge chute 17 at different rotational positions and can be formed in a manner consistent with the description of other ring gates below.

Figure 3:
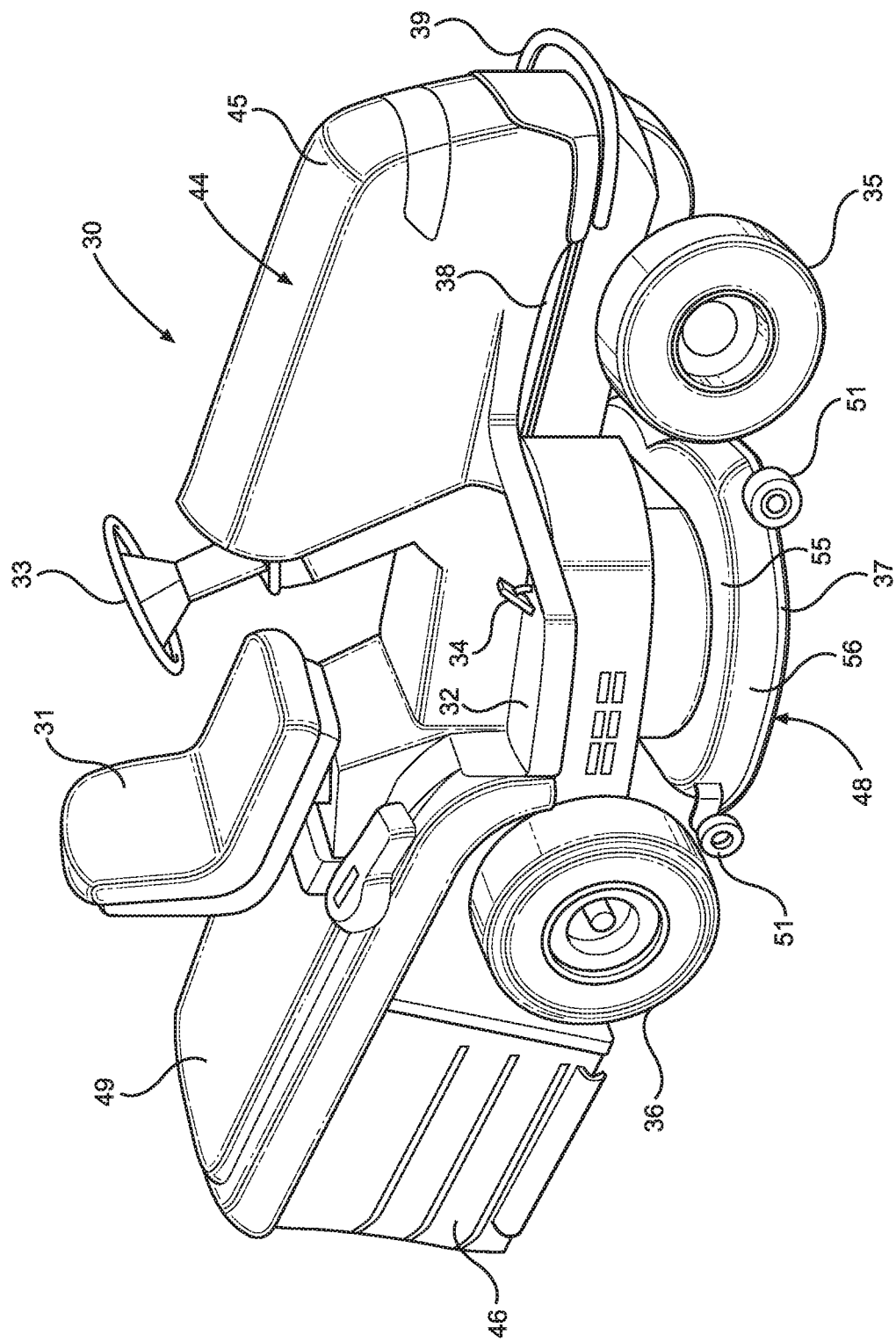
FIG. 3 is a perspective view of a lawnmower made in accordance with principles of the disclosed subject matter.

FIG. 3 is a perspective view of a riding lawnmower 30 made in accordance with principles of the disclosed subject matter. An operator of lawnmower 30 can be supported by a seat 31 and one or more foot supports 32 of the lawnmower 30.

The operator can control movement of the lawnmower 30 on a lawn, terrain, or other surface using a steering wheel 33, one or more control pedals 34, and/or other control mechanisms. The control pedals 34 can be provided on or adjacent to the foot supports 32 of the lawnmower 30. For example, a control pedal 34 can be configured as an accelerator to provide control of travel speed of the lawnmower 30 and can also be associated with a clutch and transmission to control forward/reverse direction and speed ranges for the lawnmower 30. The lawnmower 30 can include a pair of front wheels 35 and a pair of rear wheels 36.

Figure 4:
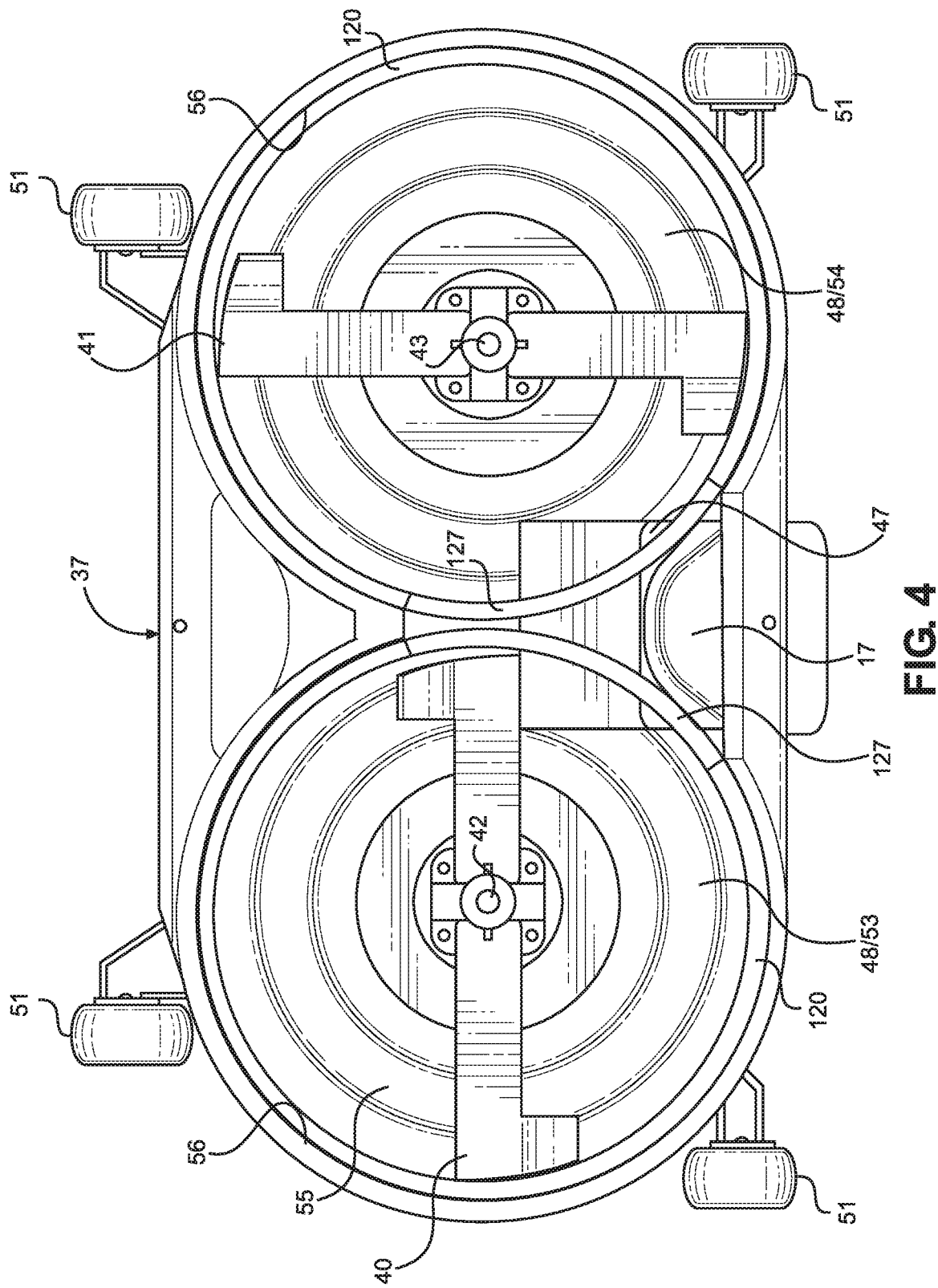
FIG. 4 is a bottom view of the lawnmower of FIG. 3.

The lawnmower 30 can include a cutter housing 37. The cutter housing 37 can also be referred to as a deck or as a mower deck or as a cutter deck of the lawnmower 30. The cutter housing 37 can support one or more blades 40, 41 as shown in FIG. 4. The blade(s) can rotate in a cutting chamber 48 defined by the cutter housing 37 and opened toward the ground. In operation of the lawnmower 30, the prime mover 38 can rotate a driveshaft that can be mechanically connected to the one or more blades 40, 41, such as by first driven shaft 42 and second driven shaft 43, so as to rotate the one or more blades. As a result, the lawnmower 30 can perform a mowing operation on vegetation, which can include or be in the form of a lawn. For example, the prime mover 38 can be in the form of a gasoline engine or an electric motor. The prime mover 38 can also power the one or more wheels 35, 36 of the lawnmower, as controlled by the operator. For example, the prime mover 38 can power the two rear wheels 36 of the lawnmower such that the two rear wheels 36 are the powered wheels.

The lawnmower 30 can include a frame or chassis 39. The frame 39 can provide a main supporting structure of the lawnmower 30 to which various components of the lawnmower 30 are attached.

The frame of the lawnmower can also support a body 44 of the lawnmower 30. The body 44 can provide an outer, finished surface that can cover the frame 39, prime mover 38, and other components or portions of components of the lawnmower 30. The body 44 can include an engine hood 45. The engine hood 45 can cover at least a portion of the prime mover 38, as described above, which can be in the form of a gasoline engine. The foot support(s) 32, as described above, can be integrally formed and/or supported by the body 44 of the lawnmower 30.

The lawnmower 30 can also include a collection bag 46 supported by the frame 39 of the lawnmower. A discharge opening and/or passageway 47 can be provided to transfer clippings from a cutting chamber 48 to the collection bag 46 when the lawnmower 30 is in a discharge mode. The body 44 of the lawnmower 30 can include a collection bag cover 49 that is positioned over and/or covers the collection bag 46.

The lawnmower 30 can include a cutter housing lift assembly that controls height of the cutter housing 37 relative to the ground (and to frame 39). The cutter housing 37 can be provided with housing wheels or housing rollers 51. The housing rollers 51 can limit how close the cutter housing 37 or particular portion of the cutter housing 37 gets into the lawn.

FIG. 4 is a bottom view of the cutter housing 37 shown in FIG. 3. The cutter housing 37 or mower deck can include a first cutting chamber 53 and a second cutting chamber 54. In other arrangements, additional cutting chambers can be provided. The first cutting chamber 53 houses a first blade 40. The second cutting chamber 54 houses a second blade 41. The first blade 40 and the second blade 41 can be driven, so as to cut grass or other vegetation, as described above.

The lawnmower shown in FIG. 4 has a synchronous cutter housing layout. In a synchronous cutter housing layout, rotation of the first blade 40 is synchronized with rotation of the second blade 41. This synchronization of the two cutting blades 40, 41 can be performed by mechanically connecting the first blade 40 to the second blade 41, such as by utilizing a timing belt or a shaft and gear drive or other similar arrangement that limits or prevents rotation of one the blades 40, 41 relative to the other of the blades 40, 41. In the illustrated synchronous cutter housing layout, the cutting circle in which the first blade 40 rotates can intersect the cutting circle in which the second blade 41 rotates such that first blade 40 enters the cutting circle of the second blade 41 and the second blade 41 enters the cutting circle of the first blade 41. Accordingly, it can be advantageous to synchronize rotation of the first blade 40 with rotation of the second blade 41 so that the two blades 40, 41 can avoid a collision or interference with each other. Such intersection of the cutting circles of the two blades 40, 41 can be desired so as to provide effective cutting coverage of the lawn. In other words, such intersection of the cutting circles of the two blades 40, 41 can be desirable so that cross-over of the blades 40, 41 is provided and vegetation between the centers of the two blades 40, 41 is cut.

The cutter housing 37 can include a top wall 55 and one or more sidewalls 56 that extend downward from the top wall 55 and toward the ground. The top wall 55 can be demarcated from the sidewall(s) 56 by the top wall 55 having a substantially horizontal disposition and the sidewalls 56 having a substantially vertical disposition. The top wall 55 can be demarcated from the sidewall(s) 56 by being constructed of respective parts and/or being separated by a particular feature of the lawnmower 30, such as a distinct bend or ridge in the cutter housing. The top wall 55 can be integrally formed with the sidewall(s) 56. The top wall 55 and the sidewall(s) 56 can form at least portions of the first cutting chamber 53 and the second cutting chamber 54 shown in FIG. 4. For example, the top wall 55 and the sidewall(s) 56 can be integrally formed of stamped or cast metal or of molded plastic construction.

The cutter housing 37 shown in FIG. 4 can include a rear discharge layout. That is, a discharge opening 47 can be provided at the rear of the cutter housing 37. The discharge opening 47 can be in communication with each of the first and second cutting chambers 53, 54. In operation, lawn clippings can be ejected from the first cutting chamber 53 and/or the second cutting chamber 54 through the discharge opening 47 and into a passageway that communicates with the collection bag 46. Accordingly, lawn clippings can be ejected from the cutting chambers 48, including the first cutting chamber 53 and the second cutting chamber 54, and passed to the collection bag 46. The collection bag 46 can then be emptied at a point in time as may be desired. Ring gates 120 can be provided within the cutting chambers 48, 58 and can include openings 127 that mate with discharge chute 17 at different rotational positions and can be formed in a manner consistent with the description of other ring gates below.

Figure 5:
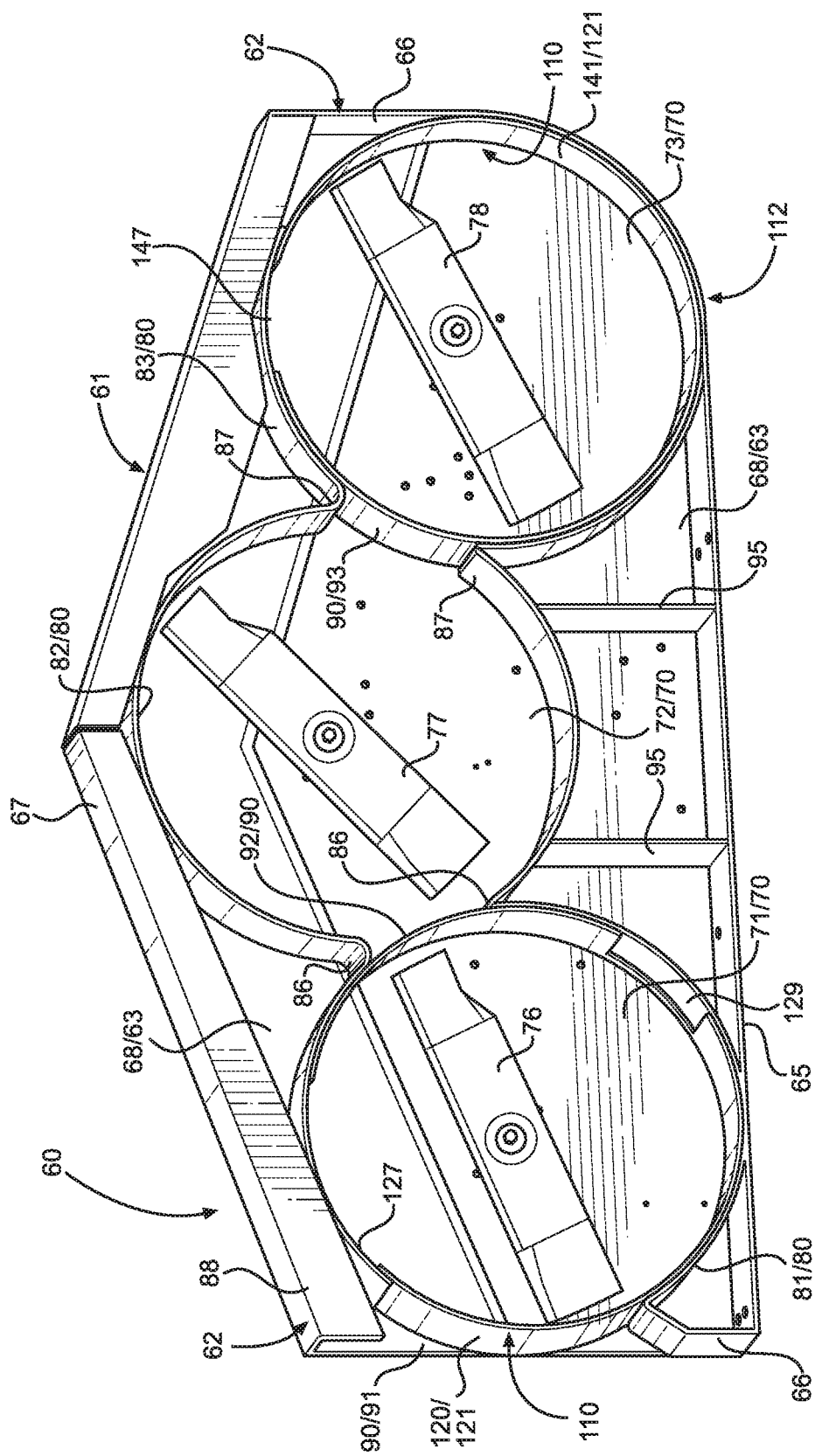
FIG. 5 is a schematic perspective bottom view of a cutter housing assembly made in accordance with principles of the disclosed subject matter.

FIG. 5 is a bottom view of anther embodiment of a cutter housing 61, which can be part of a cutter housing assembly 60. The cutter housing 61 includes a plurality of cutting chambers 70, which includes a first cutting chamber 71, a second cutting chamber 72, and a third cutting chamber 73. The cutting chambers 71, 72, 73 can be demarcated or defined by housing walls 62 and/or chamber walls 80. The housing walls 62 can include a top wall 63, a rear wall 65 and a front wall 67, as well as side walls 66. The top wall 63 can include an underside 68. The chamber walls 80 can include a first chamber wall 81, a second chamber wall 82, and a third chamber wall 83. The first chamber wall 81 can serve to demarcate, at least in part, the first cutting chamber 71. The second chamber wall 82 can serve to demarcate, at least in part, the second cutting chamber 72. The third chamber wall 83 can serve to demarcate, at least in part, the third cutting chamber 73. The first chamber wall 81 can be connected to the second chamber wall at first joints 86. The second chamber wall 82 can be connected to the third chamber wall at second joints 87. Various reinforcing structure or flanges 95 can be provided in the cutter housing 61.

Each of the cutting chambers 71, 72, 73 can be provided with a respective rotating blade. The rotating blades can include a first blade 76, a second blade 77, and a third blade 78. Each of the rotating blades can be supported by a shaft with associated pulley. The shaft can be pivotably supported by a bearing housing that is provided in the top wall 63 of the cutter housing 61. Each of the shafts can be mechanically powered by the prime mover of the particular lawnmower, in conjunction with a mechanical power transfer arrangement, such as a pulley(s) and belt arrangement as described above.

The cutter housing 61 can include a front wall 67 as well as a front lower flange 88. The front lower flange 88 can extend along a front extent of the cutter housing 61. The front lower flange 88, front wall 67, and top wall 63 can collectively form a channel to add structural support to the cutter housing 61.

The cutter housing 61 of FIG. 5 is provided, as illustrated, with a side discharge layout. The side discharge layout can include the first discharge opening 91 on the left-hand side as shown in FIG. 5, i.e. with the cutter housing upside down. From a bottom view, as shown in FIG. 5, the blades 76, 77, 78 can spin in a counterclockwise manner. As a result, lawn clippings can be propelled, due to the airflow within the cutter housing 61, along the front of the cutter housing 61 and towards the discharge opening 91.

The cutter housing 61 of FIG. 5 illustrates an asynchronous cutter housing layout of a mower deck. In such arrangement, the center blade 77 can be positioned, in a longitudinal direction of the lawnmower, in front of both of the side blades 76, 78. Thus, in the arrangement there may be cross-over of the center blade 77 with one or more of adjacent blades 76, 78 along a longitudinal axis of the lawnmower. However, because the center blade 77 is positioned in front of the adjacent blades 76, 78, the blades do not interfere with each other in rotation. Accordingly, in such an arrangement it may not be needed to time or synchronize the blades relative to each other.

As described above, a lawnmower of the disclosure can include a lift assembly, i.e. a cutter housing lift assembly that controls height of the cutter housing or deck. The height of the cutter housing 61 can be controlled so as to be positioned between a raised position and a lowered position, as well as positioned in interim positions between the raised position and the lowered position. The height of the cutter housing 61 can be controlled by a lever that is manipulated by the operator of the particular lawnmower.

As shown in FIG. 5, the cutter housing assembly 60 can include conversion assembly 110. The conversion assembly 110 can include portions or components of the cutter housing 61 as well as various other components as described below. The conversion assembly 110 allows the cutter housing 61 to provide multiple configurations including a discharge option when in an opened position 111, and a mulching option or mode when in a closed position 112, that can be controlled by a user or operator of the lawnmower, as well as interim positions therebetween that provide partial mulch or partial discharge options. The particular position can be controlled via a controller, on a control panel of the lawnmower, or by a mechanical arrangement, for example.

The conversion assembly 110 can include one or adjustable ring gates 120, such as a first adjustable ring gate 121 and a second adjustable ring gate 141. In the opened position 111, the adjustable ring gates 120 can be respectively positioned so that the discharge openings 90 are opened to provide a discharge mode in all the cutting chambers 70 of the cutter housing 61. In the closed position 112, the adjustable ring gates 120 can be positioned so that the discharge openings 90 are closed to provide a mulch mode. One adjustable ring gate 120 can be in the opened mode while another adjustable ring gate is in the closed mode.

As shown in FIG. 5, the cutter housing 61 includes a first cutting chamber 71. The first cutting chamber 71 includes a first chamber wall 81. The first chamber wall 81 can be provided with a first discharge opening 91. The cutter housing 61 can also include a second cutting chamber 72, which is provided with a second discharge opening 92. The first adjustable ring gate 121 can be rotatably secured within the first cutting chamber 71 and can include openings and walls so as to selectively open or block the first discharge opening 91 and the second discharge opening 92. The first cutting chamber 91 can be circular in shape and the first adjustable ring gate 121 can be circular in shape, with the first adjustable ring gate 121 being concentric with the first cutting chamber 71. The first adjustable ring gate 121 can be nested within the first cutting chamber 71. Accordingly, the first adjustable ring gate 121, of the conversion assembly 110, can selectively open and close the first discharge opening 91 and the second discharge opening 92.

The first adjustable ring gate 121 can include a first ring body 122. The first ring body 122 can be in the form of a cylinder or segment of a cylinder and include an upper edge 123 and a lower edge 124. Additionally, the first ring body can include an inner surface 125 and an outer surface 126. The first ring body 122 can include a first ring opening or hole 127 and a second ring opening or hole 129. The first ring body 122 can further include a first blocking segment 131 and a second blocking segment 132.

The first ring opening 127 can be defined, along a top of the first ring opening 127, by and/or associated with a first joining segment 128. The first joining segment 128 connects the blocking segments 131, 132 (of the first ring body 122) about the first ring opening 127. Accordingly, respective edges of the blocking segments 131, 132 serve to define sides of the first ring opening 127. The second joining segment 130 connects the blocking segments 131, 132 (of the first ring body 122) about the second ring opening 129. Accordingly, respective edges of the blocking segments 131, 132 serve to define sides of the second ring opening 129.

Figure 10:
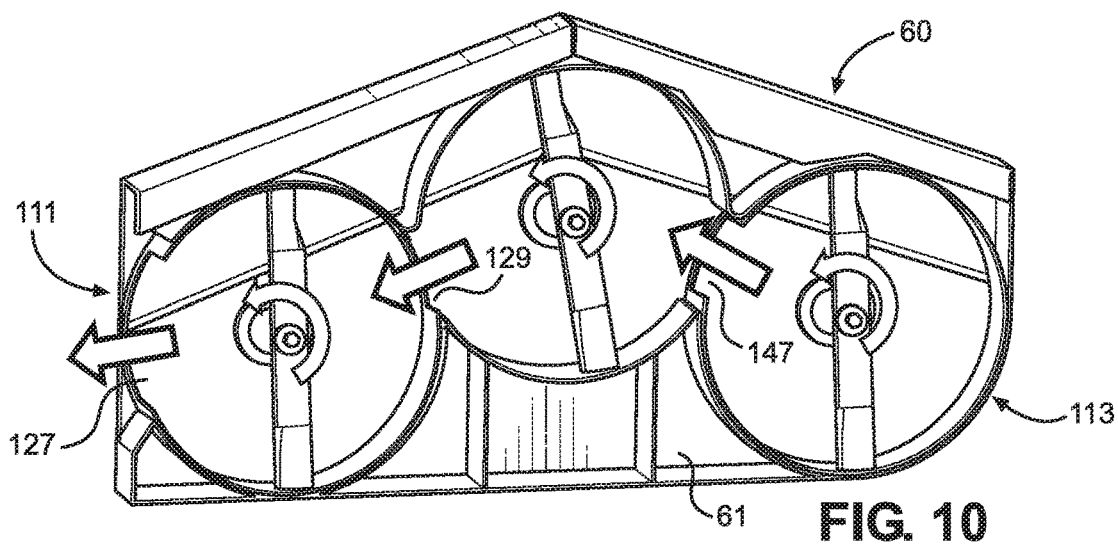
FIG. 10 is a schematic perspective bottom view of the cutter housing assembly of FIG. 5 with conversion assembly in a discharge position.
Figure 11:
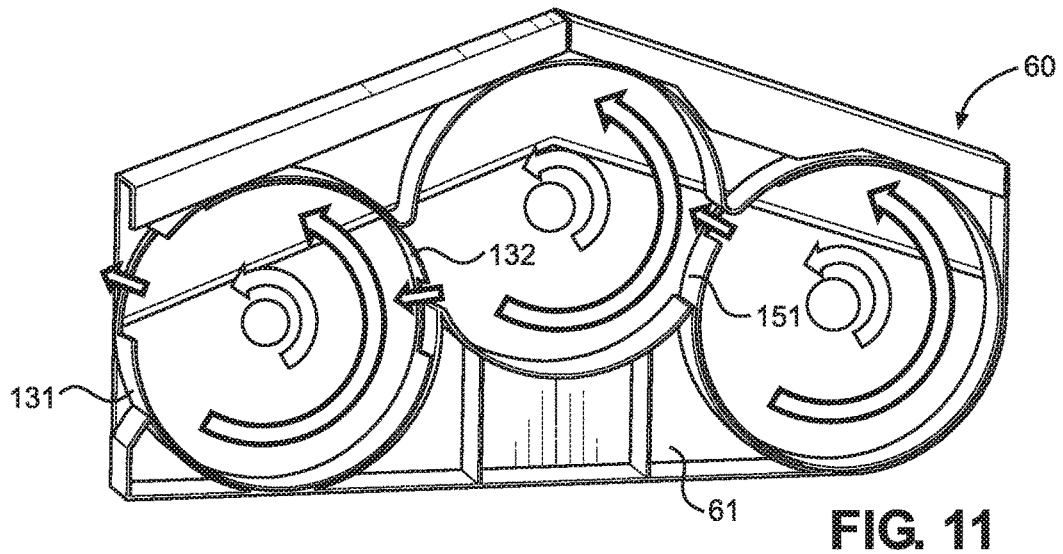
FIG. 11 is a schematic perspective bottom view of the cutter housing assembly of FIG. 5 with conversion assembly in a partial mulch position.
Figure 12:
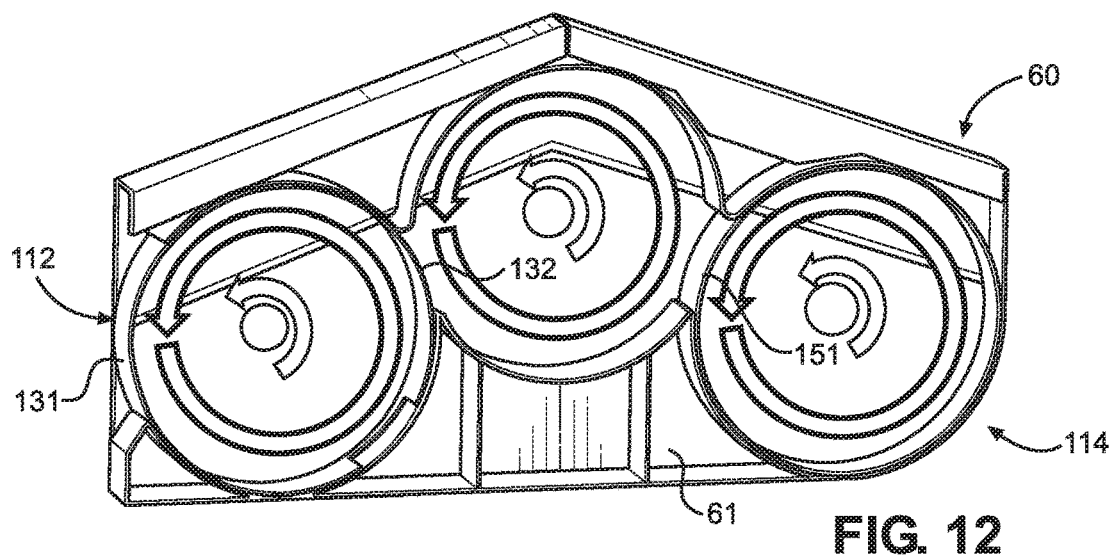
FIG. 12 is a schematic perspective bottom view of the cutter housing assembly of FIG. 5 with conversion assembly in a full mulch position.

In the opened position 111, the first adjustable ring gate 121 can be positioned with the first ring opening 127 having a first overlap with the first discharge opening 91. Since the first ring opening 127 overlaps with the first discharge opening 91, the first discharge opening 91 is opened. Accordingly, such arrangement can provide for a discharge mode. In the closed position 112, the first adjustable ring gate 121 can be positioned with the first ring opening 127 having a decreased overlap, relative to the first overlap, of the first discharge opening 91 so as to provide a mulch mode. In other words, the opened position 111 can correspond to the first adjustable ring gate 121 having the arrangement shown in FIG. 10. As the first adjustable ring gate 121 is rotated clockwise (from bottom perspective as shown in FIG. 11) the first ring opening 127 will progressively have a decreased overlap to the first discharge opening 91, as illustrated in FIG. 11 and FIG. 12. FIG. 11 illustrates a partial overlap of the first ring opening 127 with the first discharge opening 91. FIG. 12 illustrates no overlap of the first ring opening 127 with the first discharge opening 91. Accordingly, as shown in FIG. 10, when the adjustable ring gate 121 is rotated to its most counterclockwise position, then the first discharge opening 91 can be opened to the fullest extent of the particular arrangement. When the adjustable ring gate 121 is rotated to its most clockwise position (as shown in FIG. 12), then the first discharge opening 91 can be fully closed. FIG. 11 reflects an interim position to provide partial mulch/partial discharge. As described below, a rotation actuator can be used to rotate the first adjustable ring gate 121 to a desired position.

As described above, from a bottom perspective, clockwise rotation of the adjustable ring gate 121 results in closure of the first discharge opening 91 whereas counterclockwise rotation of the adjustable ring gate 121 results in opening of the first discharge opening 91. However, it should be appreciated that such rotational relationship between opening of the first discharge opening 91 and closing of the first discharge opening 91 can vary, i.e., can be reversed and/or varied in travel amount. Such variance can depend on position of the first ring opening 127 on the first ring body 122, the particular rotation actuator utilized, and the particular rotational travel range of the first adjustable ring gate 121 relative to the cutter housing 61, for example.

The first adjustable ring gate 121 can also include the second ring opening 129. Construct of the first adjustable ring gate 121, and specifically the position of the second ring opening 129 on the first ring body 122, can provide for opening (and closing) of the second discharge opening by the second ring opening 129 to coordinate with opening (and closing) by the first ring opening 127 of the first discharge opening.

In the opened position 111, the first adjustable ring gate 121 can be positioned with the second ring opening 129 having a second overlap, with the second discharge opening 92. Since the second ring opening 129 overlaps with the second discharge opening 92, the second discharge opening 92 is opened. Accordingly, such arrangement can provide for a discharge mode. In the closed position 112, the first adjustable ring gate 121 can be positioned with the second ring opening 129 having a decreased overlap, relative to the first overlap, of the second discharge opening 92 so as to provide a mulch mode. In other words, the opened position 111 can correspond to the first adjustable ring gate 121 having the arrangement shown in FIG. 10. As the first adjustable ring gate 121 is rotated clockwise (from bottom perspective as shown in FIG. 11) the second ring opening 129 will progressively have a decreased overlap to the second discharge opening 92, as illustrated in FIG. 11 and FIG. 12. FIG. 11 illustrates a partial overlap of the second ring opening 129 with the second discharge opening 92. FIG. 12 illustrates no overlap of the second ring opening 129 with the second discharge opening 92. Accordingly, as shown in FIG. 10, when the adjustable ring gate 121 is rotated to its most counterclockwise position, then the first discharge opening 91 can be opened to the fullest extent of the particular arrangement. When the first adjustable ring gate 121 is rotated to its most clockwise position (as shown in FIG. 12), then the first discharge opening 91 can be fully closed. FIG. 11 reflects an interim position to provide partial mulch/partial discharge.

As described above, a rotation actuator can be used to rotate the first adjustable ring gate 121 to a desired rotational position so as to change between mulch mode and discharge mode. More specifically, a first rotation actuator 161 can operatively engage with the first adjustable ring gate 121 so as to impart rotational movement of the first adjustable ring gate 121. The first rotation actuator 161 can be controllable by the user for rotatably moving the first adjustable ring gate between the opened position 111 and the closed position 112, as well as interim positions.

Figure 6:
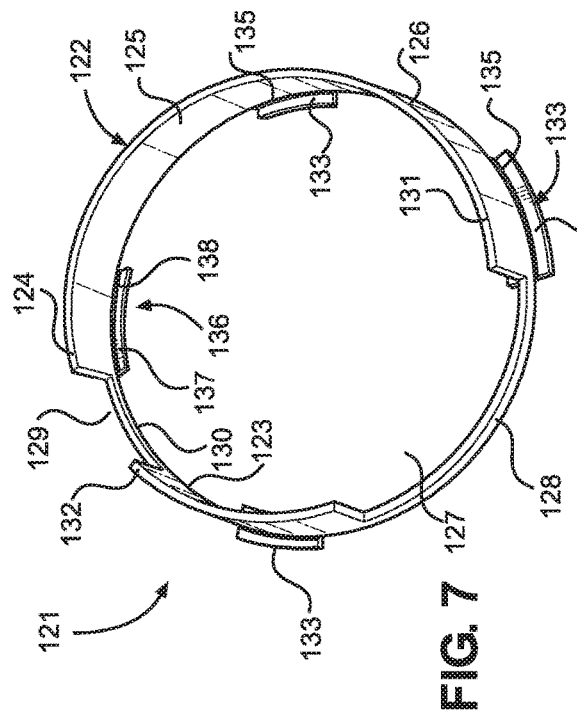
FIG. 6 is a schematic perspective top view of a first adjustable ring gate made in accordance with principles of the disclosed subject matter.
Figure 7:
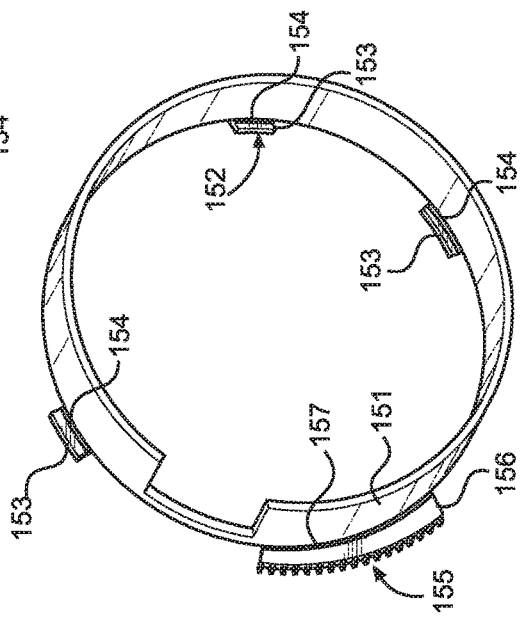
FIG. 7 is a schematic perspective bottom view of the first adjustable ring gate of FIG. 6.

Relatedly, the first adjustable ring gate 121 can be rotatably supported by the cutter housing 61. The first adjustable ring gate 121 can include a plurality of support flanges or tabs, such as first support flanges, 133. As shown in FIGS. 6 and 7, the first adjustable ring gate 121 can include three support flanges 133, but different numbers of support flanges may be provided as desired. The support flanges 133 can be of same or similar structure. The support flanges 133 can be provided on the upper edge 123 of the first ring body 122. The support flanges 133 can each extend up through a first slot arrangement 139 with first slots 140, in the cutter housing 61. The support flanges 133 can each include a support plate or flange 134 that is positioned at right angles to the outer surface 126 (of the first ring body 122) and positioned parallel to the top wall 63 of the cutter housing 61. The support flange 133 can also include a connecting flange 135. The connecting flange 135 can extend from the upper edge 123 of the first ring body 122, through the thickness of the top wall 63, of the cutter housing 61, and attach to the support plate 134. Accordingly, the support plate 134 can be attached to the first ring body 122, via the connecting flange 135, and precluded, due to its structure, from sliding through the first slot 140. Accordingly, the support plate 134 in conjunction with the connecting flange 135 can prevent the support flange 133 from being disengaged from the slot arrangement 139 while allowing rotation of the first adjustable ring gate 121. Rotation can be limited by the length and position of the first slots 140 (of the first slot arrangement 139) because each first support flange 133 is limited in travel by the slot in which it is supported.

The first support flange 133 can be constructed in different ways. Each first support flange 133 can include a tab or flange that extends vertically upward from the upper edge 123 (to define the connecting flange 135) and which is then bent over (to define the support plate 134). With such construct, the support plate 134, being a bent end at a top of the connecting flange 135, may only extend in one direction from the connecting flange. The support plate 134,153 can be formed from stamped metal. Alternatively, each support plate 134,153 can be a separate piece of metal or other material that is welded, for example spot welded, or otherwise attached to a respective connecting flange 135. With such construct, the support plate 134 can be attached at a central portion thereof to the connecting flange 135. Thus, the support plate 134 can bridge over the first slot 140 so as to engage with both sides of the first slot 140.

Figure 15:
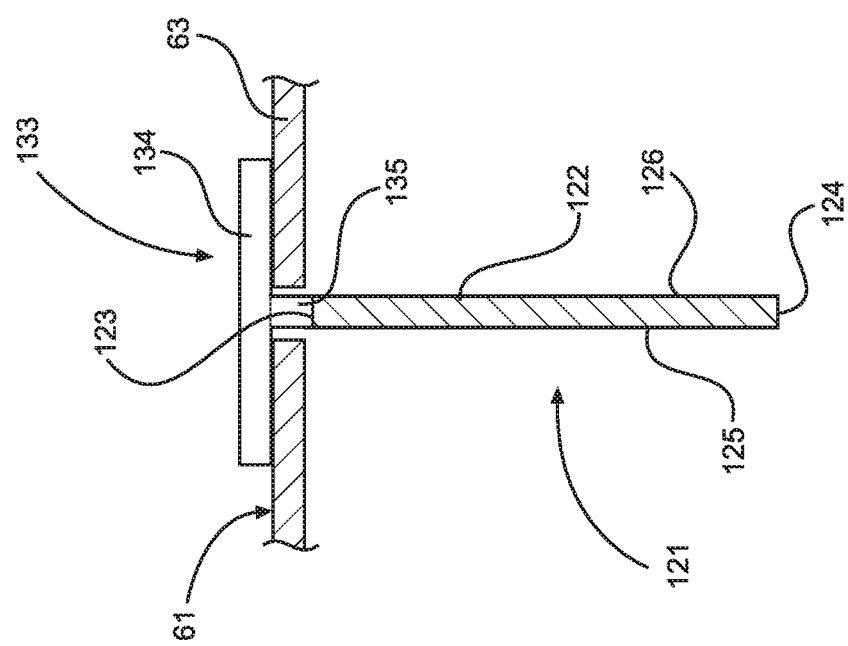
FIG. 15 is a schematic cross-sectional view showing an adjustable ring gate supported by a cutter housing in accordance with the disclosed subject matter.

FIG. 15 is a schematic cross-sectional view showing an adjustable ring gate 121 supported by a cutter housing 61. The connecting flange 135 can connect the support flange 134 with the first ring body 122. As shown, the connecting flange 135 traverses or crosses vertically through the cutter housing 61. As the height of the connecting flange 135 is increased, the "play" or "clearance" of the first adjustable ring gate 121 to the cutter housing 61 can be increased, as may be desired to allow easier rotation of the first adjustable ring gate 121 within the cutter housing 61. The connecting flange 138, the connecting flange 154, and the connecting flange 157 may be of similar structure to the connecting flange 138 and serve similar function. Each of such connecting flanges can be of height equal or greater than the thickness of the cutter housing so as to provide "play" or "clearance", i.e., so as to allow the adjustable ring gate 121 or the adjustable ring gate 141 to rotate freely without binding.

The first adjustable ring gate 121 can also include a first drive flange 136. The first drive flange 136 can include a gear rack 137 and a connecting flange 138. The connecting flange 138 can extend from the upper edge 123 of the first ring body 122, through the thickness of the top wall 63 (of the cutter housing 61) and attach to the gear rack 137. That is, the gear rack 137 can be supported by the connecting flange 138. The gear rack 137 can also serve to rotatably support the first adjustable ring gate 121 in that the gear rack 137 is precluded, due to its structure, from sliding through the respective first slot 140.

The gear rack 137, of the first drive flange 136, can include a plurality of teeth. Such teeth, of the first drive flange 136, can engage with a first rotation actuator 161. The first rotation actuator 161 can operatively engage with the gear rack 137 so as to drive the first adjustable ring gate 121 to a desired rotational amount.

Figure 13:
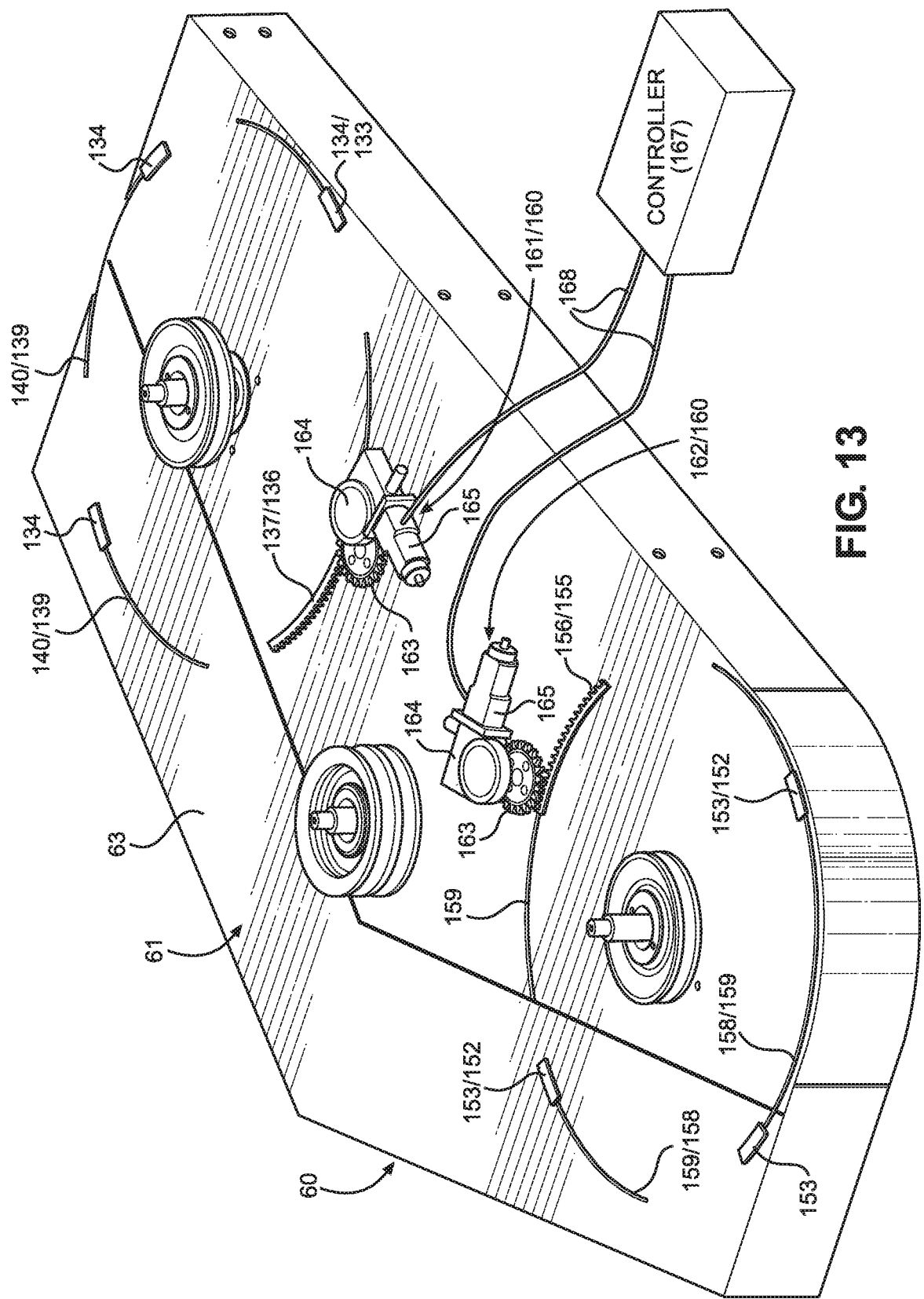
FIG. 13 is a schematic perspective top view of the cutter housing assembly of FIG. 5 with conversion assembly in a discharge position.

The first rotation actuator 161 can include a pinion gear 163. The pinion gear 163 can be part of or operatively connected to a gear assembly 164. The gear assembly 164 can be driven or powered by a motor 165. The gear assembly 164 and/or motor 165 can be affixed to the top wall 63 of the cutter housing 61 by suitable brackets, flanges, mechanical fastener, welding, and/or other attachment arrangements. As shown in FIG. 13, the pinion gear 163, of the first rotation actuator 161, can engage the first drive flange 136. As a result, rotation of the pinion gear 163 engaged with the gear rack 137 can provide rotational movement of the first adjustable ring gate 121.

As described above, rotational travel of the first adjustable ring gate 121 can be constrained or limited by constrained movement of the first support flanges 133 within respective first slots 140, as well as by constrained movement of the first drive flange 136 within a respective first slot 140. It is appreciated that sensors may be utilized to control rotation of the first adjustable ring gate 121. Use of such sensors can be used to determine when a rotational position has been attained so as to provide a desired opened position 111. Use of sensors can also be used to determine when a rotational position has been attained so as to provide a desired closed position 112. Upon a desired position being attained with movement in one direction, the motor or other power mechanism 165 can be shut off so as not to damage the first rotation actuator 161, the first slot arrangement 139, the first support flanges 133 and/or the first drive flange 136. Such a sensor to limit or control movement can include a physical limiter sensor, such as a button being abutted against an approaching stop. Alternately, the sensor to limit movement can include an encoder that senses/counts indicia such as marks or ticks on an adjacent moving part. For example, an encoder can be positioned adjacent the pinion wheel and count rotation of the pinion wheel so as to control or limit rotation of the first adjustable ring gate 121.

As shown in FIG. 13 (in the upper right of such figure), support slots (such as first slot 140) can be positioned adjacent or at a side of the cutter housing 61. Accordingly, such slot can be "opened" on one side.

Hereinafter, further details of the second adjustable ring gate 141 of the disclosure will be described.

As shown in FIG. 5 and described above, the cutter housing 61 can also include a third cutting chamber 73. The third cutting chamber 73 can include a third chamber wall 83. The third chamber wall 83 can be provided with a third discharge opening 93. The second adjustable ring gate 141, of the conversion assembly 110, can selectively open and close the third discharge opening 93. The second adjustable ring gate 141 can be rotatably secured within the third cutting chamber 73 and can include openings and walls so as to selectively open or block the third discharge opening 93. The third cutting chamber 93 can be circular in shape and the second adjustable ring gate 141 can be circular in shape, with the second adjustable ring gate 141 being concentric to the third cutting chamber 73. The second adjustable ring gate 141 can be nested within the third cutting chamber 73. The first adjustable ring gate 121 can be in the shape of a band or ring. The second adjustable ring gate 141 can be in the shape of a band or ring.

The second adjustable ring gate 141 can be of similar structure to the first adjustable ring gate 121. However, one distinction is that the second adjustable ring gate 141 can be provided to include a single ring opening or hole 147, such as a third ring opening 147 of the conversion assembly 110. The second adjustable ring gate 141 can include a second ring body 142 of the conversion assembly 110. The second ring body 142 can be in the form of a cylinder or segment of a cylinder and include an upper edge 143 and a lower edge 144. Additionally, the second ring body 142 can include an inner surface 145 and outer surface 146. The second ring body 142 can include a third ring opening as described above. The second ring body 142 can also include a third blocking segment 151 of the conversion assembly 110. The third ring opening 147 can be defined, along a top of the third ring opening 147, by and/or associated with a third joining segment 148 of the conversion assembly 110. The third joining segment 148 can connect respective ends of the third blocking segment 151 of the conversion assembly 110, about the third ring opening 147. For example, the third joining segment 148 can be a strip of material that runs along a top of the third ring opening 147 and serves to connect opposing ends of the third blocking segment 151. Accordingly, respective edges or ends of the third blocking segment 151 can serve to define sides of the third ring opening 147, in conjunction with the third joining segment 148 defining an upper extent of the third ring opening 147.

In similar manner to the first adjustable ring gate 121, the second adjustable ring gate 141 can be positioned in an open position 113 (akin to the opened position 111 of the first adjustable ring gate 121) and a closed position 114 (akin to the closed position 112 of the first adjustable ring gate 121), as characterized herein for purposes of distinction. In the open position 113, the second adjustable ring gate 141 can be positioned with the third ring opening 147 having a third overlap with the third discharge opening 93. Since the third ring opening 147 overlaps with the third discharge opening 93, the third discharge opening 93 is opened. Accordingly, such arrangement can provide for a discharge mode with regard to the third cutting chamber 73. In the closed position 114, the second adjustable ring gate 141 can be positioned with the third ring opening 147 having a decreased overlap, relative to the third overlap, of the third discharge opening 93 so as to provide a mulch mode. In other words, the open position 113 can correspond to the second adjustable ring gate 141 having the arrangement shown in FIG. 10. As the second adjustable ring gate 141 is rotated clockwise (from bottom perspective as shown in FIG. 11) the third ring opening 147 will progressively have a decreased overlap to the third discharge opening 93, as illustrated in FIG. 11 and in FIG. 12. FIG. 11 illustrates a partial overlap of the third ring opening 147 with the third discharge opening 93. FIG. 12 illustrates no overlap of the third ring opening 147 with the third discharge opening 93. Accordingly, as shown in FIG. 10, when the second adjustable ring gate 141 is rotated to its most counterclockwise position, then the third discharge opening 93 can be open to the fullest extent of the particular arrangement. When the second adjustable ring gate 141 is rotated to its most clockwise position (shown in FIG. 12) then the third discharge opening 93 can be fully closed. FIG. 11 reflects an interim position to provide partial mulch/partial discharge. A further rotation actuator such as second rotation actuator 162 of the conversion assembly 110 can be used to rotate the second adjustable ring gate 141 to a desired position.

As illustrated in FIGS. 10-12, for example, from a bottom perspective, clockwise rotation of the second adjustable ring gate 141 results in closure of the third discharge opening 93 whereas counterclockwise rotation of the second adjustable ring gate 141 results in opening of the third discharge opening 93. However, it should be appreciated that such rotational relationship between opening of the third discharge opening 93 and closing of the third discharge opening 93 can vary, i.e. can be reversed and/or varied in travel amount. Such variance can depend on position of the third ring opening 147 on the second ring body 142, the particular rotation actuator utilized, and the particular rotational "travel" range of the third discharge opening 93 relative to the cutter housing 61, for example.

A further rotation actuator can be used to rotate the second adjustable ring gate 141 to a desired rotational position so as to change between mulch mode and discharge mode. More specifically, a second rotation actuator 162 can operatively engage with the second adjustable ring gate 141 so as to impart rotational movement of the second adjustable ring gate 141. The second rotation actuator 162 can be controllable by the user for rotatably moving the second adjustable ring gate 141 between the open position 113 and the closed position 114, as well as interim positions.

Figure 8:
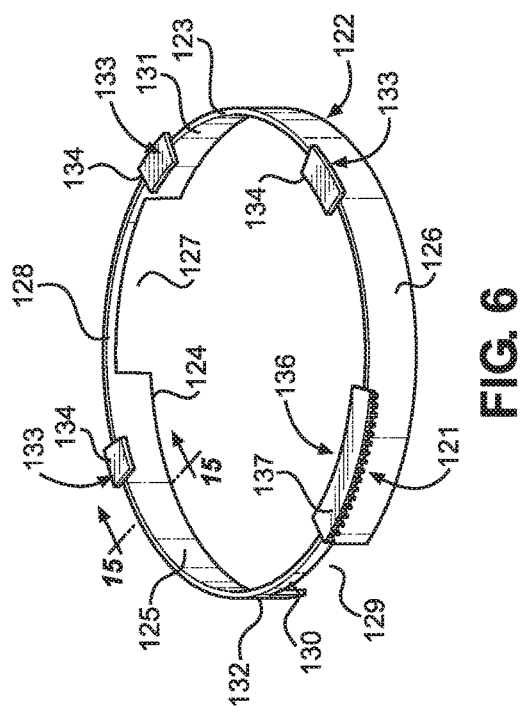
FIG. 8 is a schematic perspective top view of a second adjustable ring gate made in accordance with principles of the disclosed subject matter.
Figure 9:
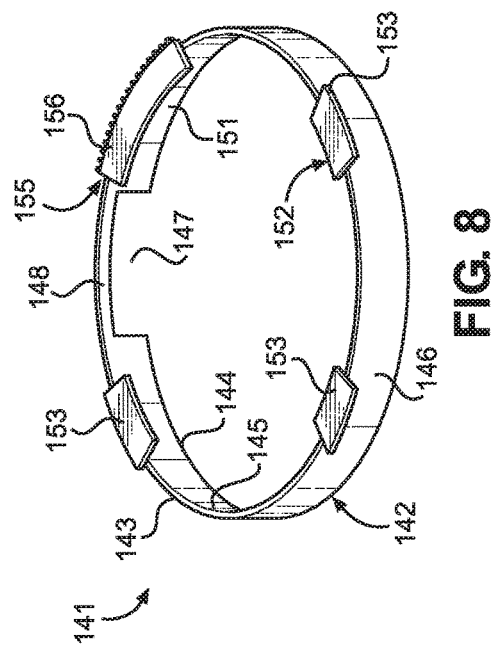
FIG. 9 is a schematic perspective bottom view of the second adjustable ring gate of FIG. 8.

Relatedly, the second adjustable ring gate 141 can be rotatably supported by the cutter housing 61. The second adjustable ring gate 141 can include a plurality of support flanges such as second support flanges 152. As shown in FIGS. 8 and 9, the second adjustable ring gate 141 can include three second support flanges 152, but different numbers of support flanges may be provided as desired. The second support flanges 152 can be of same or similar structure to each other. The second support flanges 152 can be provided on the upper edge 143 of the second ring body 142. The second support flanges 152 can each extend up through a second slot arrangement 158 with second slots 159 in the cutter housing 61. The second support flanges 152 can each include a support plate or flange 153 that is positioned at right angles to the outer surface 146 (of the second ring body 142) and positioned parallel to the top wall 63 of the cutter housing 61. The second support flange 152 can also include a connecting flange 154. The connecting flange 154 can extend from the upper edge 143 of the second ring body 142, through the thickness of the top wall 63, of the cutter housing 61, and attach to the support plate 153. Accordingly, the support plate 153 can be attached to the second ring body 142 via the connecting flange 154 and precluded, due to its structure, from sliding through the respective second slot 159. Accordingly, the support plate 153 in conjunction with the connecting flange 154 can prevent the second support flange 152 from being disengaged from the second slot arrangement 158 while allowing rotation of the second adjustable ring gate 141. Rotation can be limited by the length and position of the second slots 159 (of the second slot arrangement 158) because each second support flange 152 is limited in travel by length of the slot in which it is supported.

The second support flange 152 can be constructed in different ways. Each second support flange 152 can include a tab or flange that extends vertically upward from the upper edge 143 (to define the connecting flange 154) and which is then bent over (to define the support plate 153). With such construct, the support plate 153, being a bent end at a top of the connecting flange 154, may only extend in one direction from the connecting flange 154. The support plate 153 and flange 154 can be made from stamped metal. Alternatively, each support plate 153 can be a separate piece of metal or other material that is welded or otherwise attached to a respective connecting flange 154. With such construct, the support plate 153 can be attached at a central portion thereof to the connecting flange 154. Thus, the support plate 153 can bridge over the second slot 159 so as to engage with both sides of the second slot 159.

The second adjustable ring gate 141 can also include a second drive flange 155. The second drive flange 155 can include a gear rack 156 and a connecting flange 157. The connecting flange 157 can extend from the upper edge 143 of the second ring body 142, through the thickness of the top wall 63 (of the cutter housing 61) and attach to the gear rack 156. That is, the gear rack 156 can be supported by the connecting flange 157. The gear rack 156 can also serve to rotatably support the second adjustable ring gate 141 in that the gear rack 156 is precluded, due to its structure, from sliding through the respective second slot 159.

The gear rack 156, of the second drive flange 155, can include a plurality of teeth. Such teeth, of the second drive flange 155, can engage with a second rotation actuator 162. The second rotation actuator 162 can operatively engage with the gear rack 156 so as to drive the second adjustable ring gate 141 to a desired rotational amount.

The second rotation actuator 162 can be of similar or same structure as the first rotation actuator 161. The second rotation actuator 162 can include a pinion gear 163. The pinion gear 163 can be part of or operatively connected to a gear assembly 164. The gear assembly 164 can be driven or powered by a motor 165. The gear assembly 164 and/or motor 165 or other drive mechanism can be affixed to the top wall 63 of the cutter housing 61 by suitable brackets, flanges, mechanical fastener, welding, and/or other attachment arrangements. As shown in FIG. 13, the pinion gear 163, of the second rotation actuator 162, can engage the second drive flange 155. As a result, rotation of the pinion gear 163 engaged with the gear rack 156 can provide rotational movement of the second adjustable ring gate 141.

As described above, rotational travel of the second adjustable ring gate 141 can be constrained or limited by the second support flanges 152 within respective second slots 159, as well as by constrained movement of the second drive flange 155 within a respective second slot 159. It is appreciated that sensors may also or alternatively be utilized to control rotation of the second adjustable ring gate 141. Use of such sensors can determine when a rotational position has been attained so as to provide a desired opened position 111. Such sensors are described above with reference to the first rotation actuator 161.

The support slots 140, 159 as described herein can accommodate one, two or more support flanges and/or drive flanges. For example, as shown in FIG. 13 (in the lower left of such figure), support slots (such as second slot 159) can accommodate one, two or more second support flanges 152.

As described above, the conversion assembly 110 can include a first rotation actuator 161 (that rotates the first adjustable ring gate 121) and a second rotation actuator 162 (that rotates the second adjustable ring gate 141). The first rotation actuator 161 and the second rotation actuator 162 can collectively constitute a rotation actuator assembly 160. Alternatively, a single rotation actuator and/or a single power mechanism (for example motor) can rotate both the first adjustable ring gate 121 and the second adjustable ring gate 141. For example, respective pinion gears 163 can be positioned as shown in FIG. 13, but in contrast to FIG. 13, be driven by a single motor. The single motor can be connected to the respective pinion gears 163 utilizing a gear train, belt, and/or chain arrangement, for example. Other mechanical arrangements may be provided so as to drive the first adjustable ring gate 121 and the second adjustable ring gate 141. For example, a pneumatic drive system could drive the ring gates.

The rotation actuator assembly 160, which can include the first rotation actuator 161 and the second rotation actuator 162, can be controlled by a suitable controller 167. Accordingly, a user or operator of the lawnmower can operate the conversion assembly 110 while the operator remains seated on the lawnmower. Such operation can be performed through a controller or regulator on a control panel of the lawnmower, for example. Such controller can be operatively attached to the electric motors 165, which are respectively associated with the first adjustable ring gate 121 and the second adjustable ring gate 141, through suitable control and/or power wires 168. Should the rotation actuator assembly 160 include a single motor, in contrast to the two motors shown in FIG. 13, the controller 167 can control operation of such single motor. As described above, sensors can be utilized so as to monitor and control operation of the rotation actuator assembly 160. Such sensors can provide feedback to the controller 167 such that the controller 167 can control the first rotation actuator 161 and the second rotation actuator 162. The controller 167 can be connected to a suitable power source, such as a battery on the lawnmower, and/or control power to the rotation actuator assembly 160. For example, the controller 167 can include buttons on a control surface of the lawnmower. Such buttons can respectively control whether electrical power is provided to the rotation actuator assembly 160 and the direction of such electrical power so as to control rotational movement of the first adjustable ring gate 121 and the second adjustable ring gate 141. Other electrical components can be utilized to control power to the rotation actuator assembly 160 and/or positive-negative direction of such power provided to the rotation actuator assembly 160. The disclosed arrangement is not limited to the particulars of the pinion gear 163, the gear assembly 164, and/or the motor or power mechanism 165. For example, instead of a motor 165 a manual crank arrangement could be utilized so as to rotate the first adjustable ring gate 121 and/or second adjustable ring gate 141.

Figure 14:
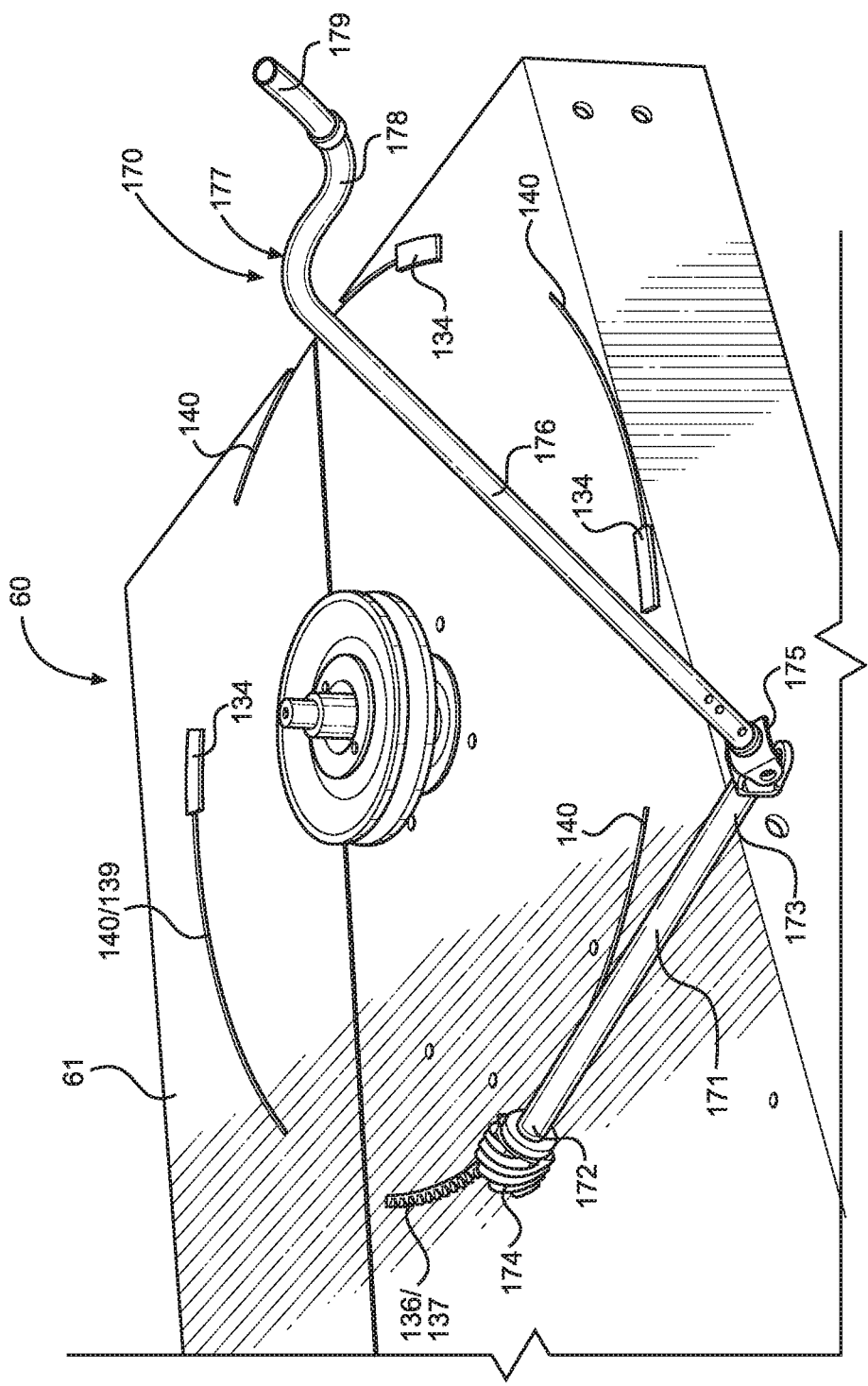
FIG. 14 is a partial schematic perspective top view of an embodiment of a cutter housing assembly with crank and gear system.

For example, FIG. 14 shows a crank and gear assembly 170 in combination with the first adjustable ring gate 121. The crank and gear assembly 170 can include a lower rod 171 that has a first end 172 and a second end 173. A gear 174 can be provided at the first end 172. The gear 174 can engage and drive the pinion gear 163 of either the first rotation actuator 161 or the second rotation actuator 162. For example, the gear 174 can be a worm gear that engages with pinion gear 163. However, other types of gears/gear pairs can be utilized as may be desired, such as in the arrangement of FIG. 14 or FIG. 13. For example, spur gears can be utilized; an internal pinion gear engaging with an inner diameter gear rack can be utilized; a spiral bevel gear arrangement can be utilized; and a worm gear arrangement can be utilized.

The second end 173, of the lower rod 171, can include or be connected to a joint 175. For example, the joint 175 can be a universal joint that allows redirection of rotational movement of an upper rod 176. The upper rod 176 can extend upwardly from the joint 175. An upper end of the upper rod 176 can include a hand crank arrangement 177. The hand crank arrangement 177 can include a bend 178 and an off-center handle 179. A user can rotate the handle 179 so as to impart rotational movement to the upper rod 176 and lower rod 171, and in turn impart rotational movement to the gear 174.

It is appreciated that the various components of embodiments of the disclosure can be made from any of a variety of materials including, for example, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques might be utilized. Also, metal stamping or cutting can be utilized. For example, metal stamping or cutting can be utilized in construction of the cutter housing 61, the first adjustable ring gate 121, and the second adjustable ring gate 141, as well as various other components described herein.

In accordance with the disclosed subject matter, features or characteristic of one embodiment may be used in conjunction with other embodiments of the disclosure, as may be desired.

While the subject matter has been described in detail with reference to exemplary embodiments thereof, it will be apparent to one skilled in the art that various changes can be made, and equivalents employed, without departing from the scope of the disclosure.

For example, the conversion assembly 110 has been described in use with a cutter housing having three cutting chambers. However, a conversion assembly 110 of the disclosure can be provided with a cutter housing having other number of cutting chambers, such as a single cutting chamber, two cutting chambers, or four cutting chambers, for example. In an arrangement having only one cutting chamber, the second adjustable ring gate 141 could be utilized without a first adjustable ring gate 121. In an arrangement having two cutting chambers, the first adjustable ring gate 121 could be utilized without the second adjustable ring gate 141.

Additionally, the conversion assembly 110 of the disclosure can be used with a wide variety of types of lawnmowers including a walk behind mower, self-propelled mower, tractor type, other ride-on type, or other type of lawnmower.

For example, embodiments are disclosed above in which components of the cutter housing assembly, such as components of the first adjustable ring gate 121 and/or second adjustable ring gate 141, are constructed of a single or unitary piece. However, embodiments are intended to include or otherwise cover components that include or are constructed of multiple pieces. For example, multiple pieces of the first adjustable ring gate 121 and/or second adjustable ring gate 141 can be separately stamped from metal and then connected together such as but not limited to welding, spot welding, adhesive or mechanical fasteners, for example.

Embodiments are disclosed above in which the cutter housing 61, the cutting chambers, the adjustable ring gates 121, 141, and the openings in the ring gates, include a specific shape, geometry, or construction. It is appreciated that shape and structure of components described herein may vary between different types of lawnmowers and different types of cutter housings. Accordingly, exemplary embodiments are also intended to include or otherwise cover assemblies that include variations in shape, geometry, or construction as dependent on assemblies and lawnmowers with which the shutter assembly is intended to be utilized.

What is claimed is:

1. A cutter housing assembly for a lawnmower comprising:
    a cutter housing that includes,
        a first cutting chamber with a first circular chamber wall that includes a first discharge opening,
        a second cutting chamber with a second circular chamber wall that includes a second discharge opening,
        a first ring gate, with a first ring opening and a first blocking segment, concentric with the first circular chamber wall and rotatably attached to the cutter housing so as to be rotatable between: (a) an opened position in which the first ring gate is positioned with the first ring opening having a first overlap with the first discharge opening to provide a discharge mode for the first cutting chamber, and (b) a closed position in which the first ring gate is positioned with the first ring opening having a decreased overlap, relative to the first overlap, with the first discharge opening to provide a mulch mode for the first cutting chamber;
        a second ring gate, with a second ring opening and a second blocking segment, concentric with the second circular chamber and rotatably attached to the cutter housing so as to be rotatable between: (a) an opened position in which the second ring gate is positioned with the second ring opening having a first overlap with the second discharge opening to provide a discharge mode for the second cutting chamber, and (b) a closed position in which the second ring gate is positioned with the second ring opening having a decreased overlap, relative to the first overlap, with the second discharge opening to provide a mulch mode for the second cutting chamber; and
    at least one actuator operatively engaged with at least one of the first ring gate and second ring gate, and controllable by a user to rotate at least one of the first ring gate and second ring gate between the opened position and the closed position, respectively,
    wherein the first ring gate rotates within the first cutting chamber and is concentric with the first cutting chamber.

2. The cutter housing assembly of claim 1, wherein in the opened position the first ring opening fully overlaps the first discharge opening so as to provide a full discharge arrangement.

3. The cutter housing assembly of claim 1, wherein in the closed position the first blocking segment fully blocks the first discharge opening to provide a full mulch arrangement.

4. The cutter housing assembly of claim 1, wherein the cutter housing further includes:
    a third cutting chamber with a third chamber wall having a third discharge opening.

5. The cutter housing assembly of claim 4, wherein the third cutting chamber is circular, and the third cutting chamber is disposed between the first cutting chamber and the second cutting chamber.

6. The cutter housing assembly of claim 4, wherein the second ring gate includes an additional ring opening configured to mate with the third discharge opening to provide a discharge mode for the third cutting chamber.

7. The cutter housing assembly of claim 1, wherein:
    the cutter housing including a first slot arrangement with first slots, and a second slot arrangement with second slots;

the first ring gate including a plurality of first support flanges that are disposed in the first slot arrangement so as to rotatably attach the first ring gate to the cutter housing; and the second ring gate including a plurality of second support flanges that are disposed in the second slot arrangement so as to rotatably attach the second ring gate to the cutter housing.

8. The cutter housing assembly of claim 7, wherein the at least one actuator includes a first electric motor and a second electric motor.

9. The cutter housing assembly of claim 7, wherein:

the first ring gate includes a first ring body, having cylindrical shape, that includes the first ring opening, and the plurality of first support flanges extending upwardly from the first ring body and through the first slots to be in contact with and supported by a top wall of the cutter housing; and the second ring gate includes a second ring body, having cylindrical shape, that includes the second ring opening, and the plurality of second support flanges extending upwardly from the second ring body and through the second slots to be in contact with and supported by the top wall of the cutter housing.

10. The cutter housing assembly of claim 9, wherein the first ring gate includes a first drive flange, extending from the first ring body, and a first gear rack on the first drive flange, and the at least one actuator includes a gear assembly that drives the first gear rack so as to rotate the first ring gate; and the second ring gate includes a second drive flange, extending from the second ring body, and a second gear rack on the second drive flange.

11. The cutter housing assembly of claim 1, wherein the cutter housing includes slots, and the first ring gate includes a plurality of support flanges that are engaged with the slots so as to rotatably attach the first ring gate to the cutter housing.

12. The cutter housing assembly of claim 1, wherein the first ring gate includes a ring body, having cylindrical shape, that includes the first ring opening.

13. The cutter housing assembly of claim 1, wherein the first ring gate and second ring gate are configured to stop at intermediate locations between a respective opened position and closed position to provide a partial mulch mode.

14. The cutter housing assembly of claim 1, wherein the at least one actuator includes a hand crank that drives a gear.

15. A cutter housing assembly for a lawnmower comprising:

a first cutting side wall and top wall that define a first cutting chamber with a first discharge opening located within a side of the first cutting wall, the top wall including at least one slot;

a ring gate, with a first ring opening and first blocking segment, the ring gate including at least one flange extending into the at least one slot of the top wall so as to be selectively rotatable in the slot between:

(a) an opened position in which the ring gate is positioned with the first ring opening having a first overlap with the first discharge opening to provide a discharge mode, and (b) a closed position in which the ring gate is positioned with the first ring opening having a decreased overlap, relative to the first overlap, with the first discharge opening to provide a mulch mode;

a first rotation actuator including a motor operatively engaged with the at least one flange of the ring gate, and the first rotation actuator controllable by a user for rotating the ring gate between the opened position and the closed position, wherein the ring gate is configured to rotate within the first cutting chamber and is concentric with the first cutting chamber; and a second cutting chamber with a second chamber side wall including a second discharge opening, wherein the ring gate further includes a secondary ring opening and a secondary blocking segment configured such that, in the opened position the secondary ring opening has a secondary overlap with the second discharge opening, and (b) in the closed position the secondary ring opening has a decreased overlap, relative to the secondary overlap, with the second discharge opening.

16. The cutter housing assembly of claim 15, wherein the ring gate is a cylindrical structure that includes a plurality of flanges that extend from an upper edge of the cylindrical structure, and the flanges extend through the slot so as to rotatably support the ring gate.

17. The cutter housing assembly of claim 15, further comprising:

a second ring gate located within the second cutting chamber, the second ring gate including a second ring opening and a second ring blocking segment, and the second ring gate rotatable between, (a) a second ring gate opened position in which the second ring gate is positioned with the second ring opening having an overlap with the second discharge opening to provide a second ring discharge mode, and (b) a closed position in which the second ring gate is positioned with the second ring opening having a decreased overlap, relative to the overlap, with the second discharge opening to provide a mulch mode.

18. A lawnmower comprising:

a cutter housing assembly that includes a first cylindrically shaped cutting chamber having a first discharge opening, and a second cylindrically shaped cutting chamber in selective fluid communication with the first cylindrically shaped cutting chamber via a second discharge opening;

a first cylindrically shaped ring gate located within and concentric with the first cylindrically shaped cutting chamber, the first cylindrically shaped ring gate including a side wall and a first opening in the side wall;

a second cylindrically shaped ring gate located within and concentric with the second cylindrically shaped cutting chamber, the second cylindrically shaped ring gate including a second side wall and a second opening in the second side wall; and an actuator operatively connected to the first cylindrically shaped ring gate and the second cylindrically shaped ring gate and configured to rotate each of the first cylindrically shaped ring gate and the second cylindrically shaped ring gate, and the first cylindrically shaped ring gates moves between an opened position and a closed position; when in the open position the first cylindrically shaped ring gate is positioned with the first opening having a first overlap with the first discharge opening to provide a discharge mode for the first cylindrically shaped cutting chamber, and when in the closed position the first cylindrically shaped ring gate is positioned with the first opening having a decreased overlap, relative to the first overlap, with the first discharge opening to provide a mulch mode for the first cylindrically shaped cutting chamber.

19. The lawnmower of claim 18, further comprising:
a third cylindrically shaped cutting chamber located immediately adjacent to and in selective fluid communication with the second cylindrically shaped cutting chamber via a third discharge opening, wherein
the second cylindrically shaped ring gate includes a third opening in the side wall, and
the second and third openings are selectively aligned with the second and third discharge openings to provide a discharge mode for each of the second and third cylindrical cutting chambers, respectively.

20. The lawnmower of claim 18, wherein the cutter housing assembly includes a ceiling wall that includes a first slot and a second slot, and the first cylindrically shaped ring gate extends through the first slot and includes a plurality of flanges located adjacent an outer surface of the ceiling wall and adjacent the first slot, and the second cylindrically shaped ring gate extends through the second slot and includes a plurality of second flanges located adjacent the outer surface of the ceiling wall and adjacent the second slot.

* * * * *